(12) United States Patent
Bell et al.

(10) Patent No.: US 10,794,745 B2
(45) Date of Patent: Oct. 6, 2020

(54) VIBRATORY METER WITH POINTED FLOW TUBE

(71) Applicant: Micro Motion, Inc., Boulder, CO (US)

(72) Inventors: Mark James Bell, Longmont, CO (US); Joel Weinstein, Boulder, CO (US); Mitalee Nayan Desai, Boulder, CO (US); Clinton R. Griffin, Erie, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/637,976

(22) PCT Filed: Aug. 23, 2017

(86) PCT No.: PCT/US2017/048181
§ 371 (c)(1),
(2) Date: Feb. 10, 2020

(87) PCT Pub. No.: WO2019/040058
PCT Pub. Date: Feb. 28, 2019

(65) Prior Publication Data
US 2020/0191631 A1    Jun. 18, 2020

(51) Int. Cl.
*G01F 1/84*    (2006.01)

(52) U.S. Cl.
CPC .......... *G01F 1/8422* (2013.01); *G01F 1/8404* (2013.01); *G01F 1/8477* (2013.01)

(58) Field of Classification Search
CPC ..... G01F 1/8422; G01F 1/8404; G01F 1/8477
USPC .................................................. 73/861.355
See application file for complete search history.

(56) References Cited

U.S. PATENT DOCUMENTS 5,959,206 A * 9/1999 Ryrko ................ G01C 19/5656
73/504.12
2009/0272200 A1    11/2009 Frahnow et al.
2016/0202101 A1    7/2016 Sparks

FOREIGN PATENT DOCUMENTS

JP    S62170819 A    7/1987
WO   2017200518 A1   11/2017

* cited by examiner

*Primary Examiner* — Nimeshkumar D Patel
*Assistant Examiner* — Jean F Morello
(74) *Attorney, Agent, or Firm* — The Ollila Law Group LLC

(57) ABSTRACT

A vibratory meter (5), and methods of manufacturing the same are provided. The vibratory meter includes a pickoff (170l), a driver (180), and a flow tube (400) comprising a tube perimeter wall with: a first substantially planar section (406a), a second substantially planar section (406b) coupled to the first substantially planar section to form a first angle $\theta_1$ (404), and a first curved section (406c).

19 Claims, 7 Drawing Sheets

VIBRATORY METER WITH POINTED FLOW TUBE

TECHNICAL FIELD

The examples described below relate to vibratory meters and flow tubes for vibratory meters. More particularly, the examples are directed to vibratory meters including flow tubes with pointed sections.

TECHNICAL FIELD

Vibratory meters, such as Coriolis mass flowmeters and vibrating densitometers, typically operate by detecting motion of a vibrating flow tube that contains a flowing material. Properties associated with the material in the flow tube, such as mass flow, density and the like, can be determined by processing measurement signals received from motion transducers associated with the flow tube. Vibratory meters have meter assemblies with one or more flow tubes of a straight or curved configuration. Each flow tube configuration in a Coriolis mass flow meter has a set of natural vibration modes, which may be of simple bending, torsional, or coupled type. Each flow tube can be driven to oscillate at a preferred mode.

As material begins to flow through the flow tube(s), Coriolis forces cause each point along the flow tube(s) to have a different phase. For example, the phase at the inlet end of the flowmeter lags the phase at the centralized driver position, while the phase at the outlet leads the phase at the centralized driver position. Pickoffs on the flow tube(s) produce sinusoidal signals representative of the motion of the flow tube(s). Signals output from the pickoffs are processed to determine the time delay between the pickoffs. The time delay between the two or more pickoffs is proportional to the mass flow rate of material flowing through the flow tube(s).

A meter electronics connected to the driver generates a drive signal to operate the driver, and to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the flow tube(s) at a desired flow tube amplitude and frequency. Typically, the pickoffs include a magnet and coil arrangement very similar to the driver arrangement.

In some applications, it may be desirable to increase the cross sectional area of a flow tube for a vibratory meter to increase fluid flow. Previously, however, it was not always possible to increase the cross sectional area of a flow tube without increasing the size of the meter. Most prior vibratory meters feature flow tubes with circular perimeter walls. Increasing the diameter of a circular flow tube perimeter wall means extending the dimensions of the flow tube in all directions, however, which may cause problems in some applications. For example, when a Reynolds number is low, typically due to high viscosity of a fluid in the vibratory meter, there may be flow profile effects, or viscosity-related effects, which can reduce the sensitivity of a vibratory meter. Typically, a vibratory meter with a tube length l to drive-direction inner tube diameter d (l/d) ratio of 25 or less will experience flow profile effects. Increasing the diameter d of a flow tube therefore may result in a need to increase the length l of the flow tube, and the size of the meter.

Some newer vibratory meters include multichannel flow tubes. Multichannel flow tubes include one or more channel divisions inside of the flow tube perimeter wall that divide the flow tube into two or more channels. The multichannel flow tubes feature a narrower effective diameter $d_{eff}$, which can be helpful in preventing flow profile effects. Multichannel flow tubes can also help prevent decoupling in multiphase fluids, and velocity of sound (VOS) effects in gases and multiphase fluids, both of which are sources of errors in meters.

When channel divisions are incorporated into prior vibratory meter designs, however, for example in multichannel flow tubes with circular diameters, the channels reduce the cross-sectional area for flow through a flow tube. This may cause a constriction in the multichannel flow tube.

One way to manufacture flow tubes, either single channel flow tubes or multichannel flow tubes with their one or more inner channels, is via additive manufacturing, or 3D printing. 3D printing is most straightforward when a part being fabricated includes components that are perpendicular to the printer bed. When components are oriented parallel to the printer bed, or within a predetermined acute angle of the printer bed, however, additional support material may be required to print the component. It is then necessary to remove the support material after the printing is complete.

Prior flow tubes include perimeter tube walls which include sections that are parallel to or nearly parallel to the 3D printer bed. For example, a circular perimeter tube wall may require supports to print at the top and the bottom portions of the perimeter tube wall, relative to the 3D printer bed.

Accordingly, there is a need for flow tubes and vibratory meters that can increase the tube cross sectional area for fluid flow, without extending the drive-direction inner diameter d. There is also a need for flow tubes that can be manufactured via additive methods without additional material for support. Such solutions can be realized with a pointed flow tube.

SUMMARY

A vibratory meter is provided. The vibratory meter includes a pickoff attached to a flow tube, a driver coupled to the flow tube, the driver being configured to vibrate the flow tube, and the flow tube comprising a tube perimeter wall comprising: a first substantially planar section, a second substantially planar section, coupled to the first substantially planar section to form a first angle $\theta_1$, and a first curved section.

A method of forming a vibratory meter is provided. The method includes providing a flow tube with a tube perimeter wall comprising: a first substantially planar section, a second substantially planar section coupled to the first substantially planar section to form a first angle $\theta_1$, and a first curved section; coupling a driver to the flow tube; and coupling a pickoff to the flow tube.

ASPECTS

In a further aspect, the first angle $\theta_1$ may be less than or equal to 100 degrees.

In a further aspect, the first angle $\theta_1$ may be less than or equal to 120 degrees.

In a further aspect, the tube perimeter wall further may comprise a second curved section (506f) and a third substantially planar section (506d) coupled to a fourth substantially planar section (506e), wherein the fifth substantially planar section and the sixth substantially planar section form a second angle θ₂ (504).

In a further aspect, the second angle θ₂ may be equal to the first angle θ₁.

In a further aspect, a first pointed section (516a) to a second pointed section (516b) height h (514) may be $$h = \frac{d}{\cos\left(90 - \frac{\theta 1}{2}\right)},$$

wherein the first pointed section is formed by the first substantially planar section and the second substantially planar section, the second pointed section is formed by the third substantially planar section and the fourth substantially planar section, and d is the maximum diameter d (204) of the tube perimeter wall perpendicular to the first pointed section to second pointed section height h.

In a further aspect, the vibratory meter may further comprise a first channel division (606a) enclosed within and coupled to the tube perimeter wall, the first channel division and the tube perimeter wall forming a first channel (608a) and a second channel (608b) in the flow tube.

In a further aspect, the first channel division may be substantially planar.

In a further aspect, the vibratory meter may further comprise a second channel division (606b) enclosed within and coupled to the tube perimeter wall, the second channel division dividing the second channel and a third channel (608c) in the flow tube.

In a further aspect, the second channel division may be substantially planar and substantially parallel to the first channel division.

In a further aspect, the first angle θ₁ may be less than or equal to 100 degrees.

In a further aspect, the first angle θ₁ may be less than or equal to 120 degrees.

In a further aspect, the vibratory meter may further comprise a sixth substantially planar section (806f), wherein the fifth substantially planar section and the sixth substantially planar section form a second angle θ₂ (804).

In a further aspect, the second angle θ₂ may be equal to the first angle θ₁.

In a further aspect, a first pointed section (816a) to a second pointed section (816b) height h (514) may be $$h = \frac{d}{\cos\left(90 - \frac{\theta 1}{2}\right)},$$

wherein the first pointed section is formed by the first substantially planar section and the second substantially planar section, the second pointed section is formed by the fifth substantially planar section and the sixth substantially planar section, and d is the maximum diameter d (204) of the tube perimeter wall perpendicular to the first pointed section to second pointed section height h.

In a further aspect, the vibratory meter may further comprise a first channel division (908a) enclosed within and coupled to the tube perimeter wall, the first channel division and the tube perimeter wall forming a first channel (910a) and a second channel (910b) in the flow tube.

In a further aspect, the first channel division may be substantially planar.

In a further aspect, the vibratory may further comprise a second channel division (908b) enclosed within and coupled to the tube perimeter wall, the second channel division dividing the second channel and a third channel (910c) in the flow tube.

In a further aspect, the second channel division may be substantially planar and substantially parallel to the first channel division.

In a further aspect, the tube perimeter wall may further comprise a second curved section; a third substantially planar section; and a fourth substantially planar section coupled to the third substantially planar section to form a second angle θ₂, wherein the tube perimeter wall further comprises the second curved section, the third curved section, and the fourth substantially planar section.

In a further aspect, a first pointed section (516a) to a second pointed section (516b) height h (514) may be $$h = \frac{d}{\cos\left(90 - \frac{\theta 1}{2}\right)},$$

wherein the first pointed section is formed by the first substantially planar section and the second substantially planar section, the second pointed section is formed by the third substantially planar section and the fourth substantially planar section, and d is the maximum diameter d (204) of the tube perimeter wall perpendicular to the first pointed section to second pointed section height h.

In a further aspect, the tube perimeter wall may further comprise a sixth substantially planar section, wherein the fifth substantially planar section and the sixth substantially planar section form a second angle θ₂.

In a further aspect, a first pointed section (816a) to a second pointed section (816b) height h (514) may be $$h = \frac{d}{\cos\left(90 - \frac{\theta 1}{2}\right)},$$

wherein the first pointed section is formed by the first substantially planar section and the second substantially planar section, the second pointed section is formed by the fifth substantially planar section and the sixth substantially planar section, and d is the maximum diameter d (204) of the tube perimeter wall perpendicular to the first pointed section to second pointed section height h.

In a further aspect, the first angle θ₁ may be less than or equal to 100 degrees.

In a further aspect, the first angle θ₁ may be less than or equal to 120 degrees.

In a further aspect, the first angle θ₁ may be equal to the second angle θ₂.

In a further aspect, the flow tube may further comprise a first channel division enclosed within and coupled to the tube perimeter wall, the first channel division and the tube perimeter wall forming a first channel and a second channel in the flow tube.

In a further aspect, the first channel division may be substantially planar.

In a further aspect, the flow tube may further comprise a second channel division enclosed within and coupled to the tube perimeter wall, the second channel division dividing the second channel and a third channel in the flow tube.

BRIEF DESCRIPTION OF THE DRAWINGS

The same reference number represents the same element on all drawings. The drawings are not necessarily to scale.

DETAILED DESCRIPTION

The present disclosure describes vibratory meters including flow tubes with a pointed section, and methods of forming a vibratory meter including the flow tubes with a pointed section.

Figure 1:
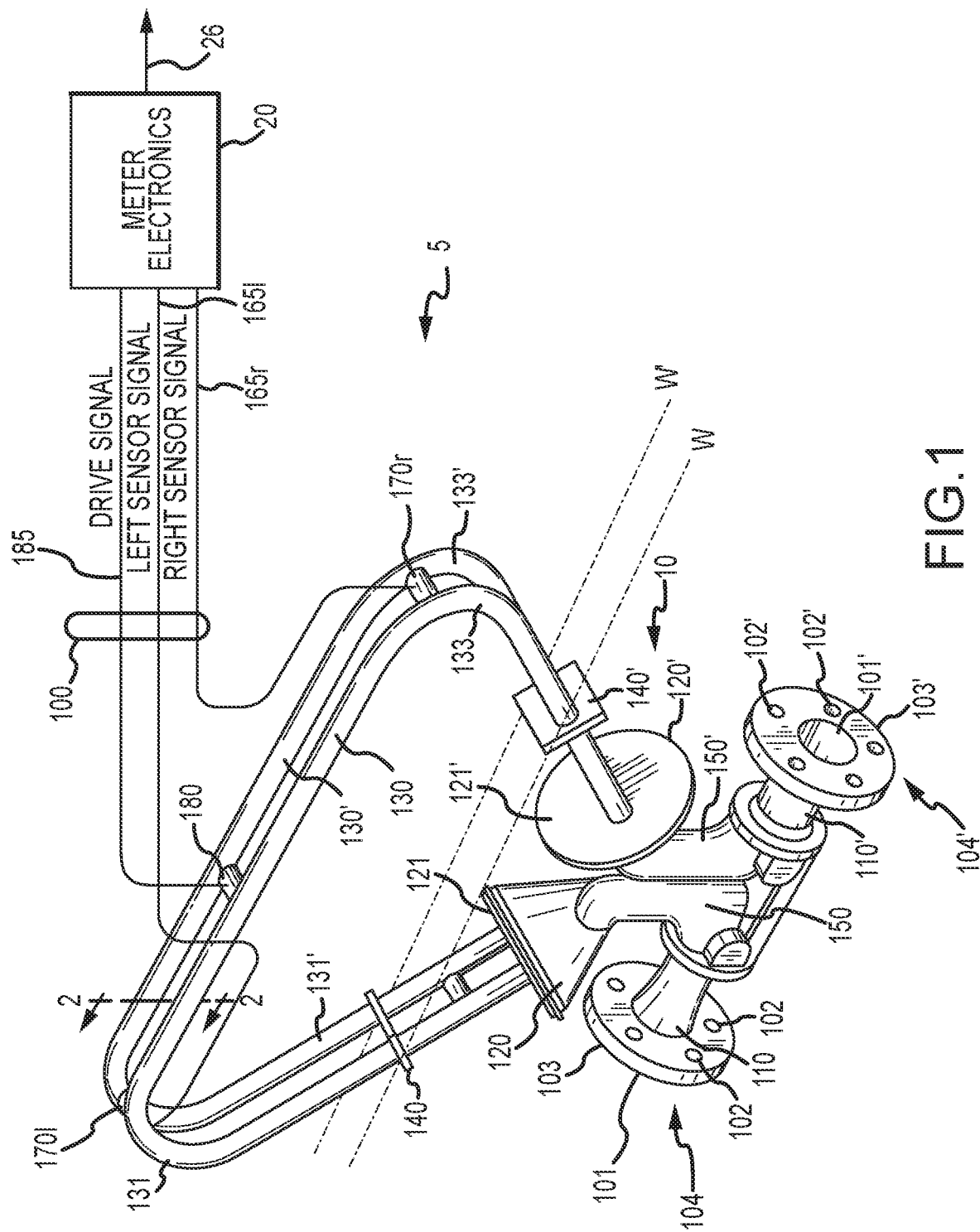
FIG. 1 depicts a vibratory flowmeter, in accordance with an example.

FIG. 1 depicts a vibratory meter 5 with a multichannel flow tube 130 in accordance with an example. As shown in FIG. 1, the vibratory meter 5 comprises a meter assembly 10 and meter electronics 20. The meter assembly 10 responds to the mass flow rate and density of a process material. The meter electronics 20 is connected to the meter assembly 10 via leads 100 to provide density, mass flow rate, and temperature information over communications path 26, as well as other information. Information and commands may be further received at meter electronics 20 over communications path 26.

A Coriolis flow meter structure is described, although this is not intended to be limiting. Those of skill will readily understand that the present Application could be practiced as a vibrating tube densitometer, tuning fork densitometer, or the like.

The meter assembly 10 includes a pair of manifolds 150 and 150', flanges 103 and 103' having flange necks 110 and 110', a pair of parallel flow tubes 130 and 130', driver 180, and a pair of pick-off sensors 170*l* and 170*r*. Flow tubes 130 and 130' have two essentially straight inlet legs 131, 131' and outlet legs 133, 133', which converge towards each other at flow tube mounting blocks 120 and 120'. The flow tubes 130, 130' bend at two symmetrical locations along their length and are essentially parallel throughout their length. Brace bars 140 and 140' serve to define the axis W and W' about which each flow tube 130, 130' oscillates. The legs 131, 131' and 133, 133' of the flow tubes 130, 130' are fixedly attached to flow tube mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the flow tube mounting block 120 having a surface 121. Within the manifold 150, the material is divided and routed through the flow tubes 130, 130'. Upon exiting the flow tubes 130, 130', the process material is recombined in a single stream within the flow tube mounting block 120' having a surface 121' and the manifold 150' and is thereafter routed to outlet end 104' connected by the flange 103' having holes 102' to the process line (not shown).

The flow tubes 130, 130' are selected and appropriately mounted to the flow tube mounting blocks 120, 120' to have substantially the same mass distribution, moments of inertia and Young's modulus about bending axes W-W and W'-W', respectively. These bending axes go through the brace bars 140, 140'.

Both flow tubes 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the flow tube 130' and an opposing coil mounted to the flow tube 130 and through which an alternating current is passed for vibrating both flow tubes 130, 130'. A suitable drive signal is applied by the meter electronics 20, via lead 185, to the driver 180.

The meter electronics 20 receives the left and right sensor signals appearing on leads 165*l*, 165*r*, respectively. The meter electronics 20 produces the drive signal appearing on lead 185 to driver 180 and vibrate flow tubes 130, 130'. The meter electronics 20 processes the left and right sensor signals and the RTD signal to compute the mass flow rate and the density of the material passing through meter assembly 10. This information, along with other information, may be transmitted by meter electronics 20 over communications path 26.

While FIG. 1 depicts a single meter assembly 10 in communication with meter electronics 20, those skilled in the art will readily appreciate that multiple sensor assemblies may be in communication with meter electronics 20. Further, meter electronics 20 may be capable of operating a variety of different sensor types. Each sensor assembly, such as the meter assembly 10 in communication with meter electronics 20, may have a dedicated section of a storage system within meter electronics 20.

Meter electronics 20 may include various other components and functions, as will be understood by those of skill. These additional features may be omitted from the description and the figures for brevity and clarity.

Vibratory meter 5 includes flow tubes 130, 130'. Flow tubes 130, 130' have a plurality of fluid channels through which a material, such as a single phase or multiphase fluid, can flow. That is, the fluid flowing through the flow tubes 130, 130' may flow through two or more fluid channels.

FIGS. 2-9 each represent an example cross section of flow tube 130, 130' that will be discussed below. The example flow tube cross section is represented by the line indicated by 2-2 indicated in FIG. 1.

Figure 2:
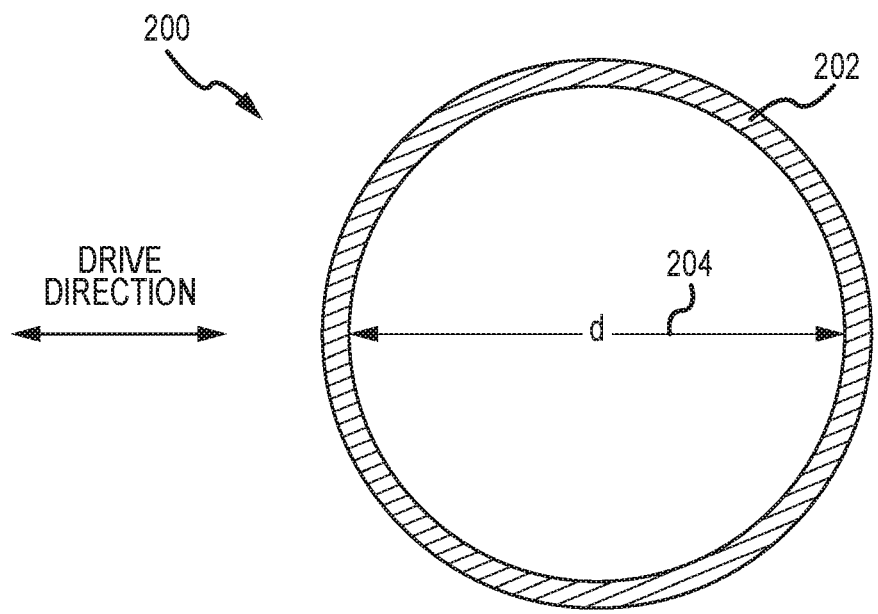
FIG. 2 depicts a cross-section of a flow tube 200.

FIG. 2 depicts a cross section of a prior flow tube 200. Flow tube 200 includes a tube perimeter wall 202 that is shaped in a circle. FIG. 2 indicates the drive direction of the vibratory meter. Sometimes it is desirable to increase the total cross sectional area of a flow tube to increase the fluid flow capacity in a meter. Prior solutions included increasing the inner diameter d 204 of tube perimeter wall 202. However, flow profile effects increase when the ratio of the flow tube length l to its inner diameter d in the drive direction is relatively low. Therefore, for some applications, increasing the radius of circular flow tube 200 without also increasing the flow tube length l, and the size of vibratory meter, is not possible without losing meter accuracy.

Figure 3:
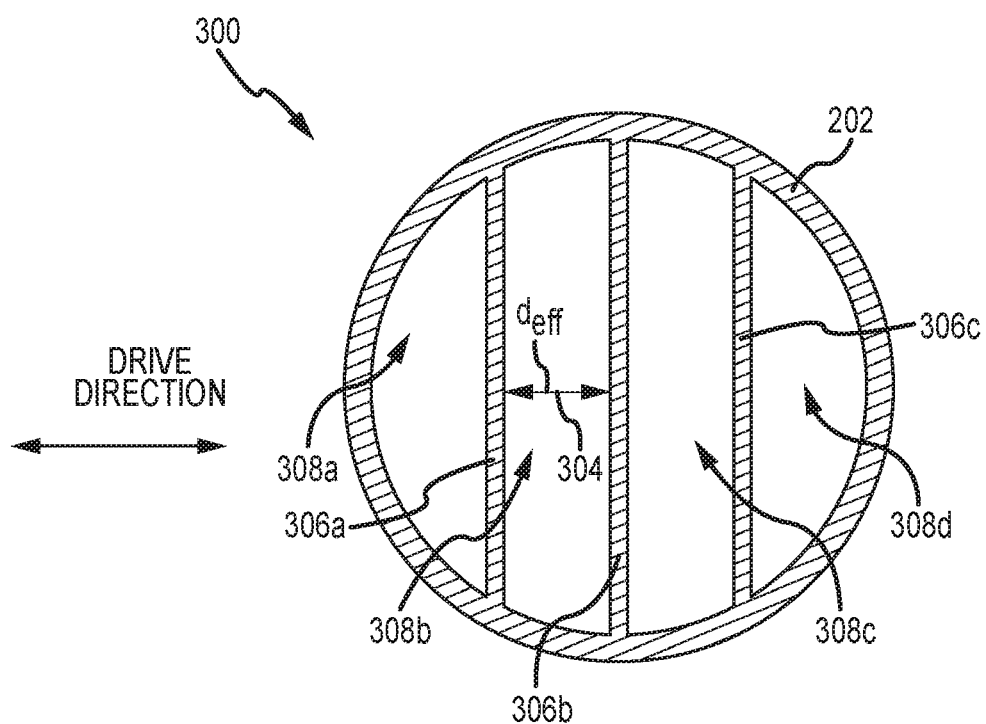
FIG. 3 depicts a cross-section of a flow tube 300.

FIG. 3 represents a further cross section of a prior multichannel flow tube 300. Flow tube 300 is like flow tube 200 in that it also includes a tube perimeter wall 202, but it differs in that it includes one or more channel divisions 306a-306c. One or more channel divisions 306a-306c are configured to provide two or more channels 308a-308d. Each channel 308a-308d features a reduced effective diameter $d_{\mathit{eff}}$ in at least one direction, which, in the example of flow tube 300, is the drive direction of the vibratory meter. The narrower effective diameter $d_{\mathit{eff}}$ 304 may allow for a reduction in decoupling of multiphase fluids, a reduction in velocity of sound errors, and a reduction in flow profile effects.

The additional channel divisions 306a-306c provided with flow tube 300 may reduce the total cross sectional area through which a fluid may pass, however. Therefore, flow tube 300 may be more constricted than flow tube 200.

Figure 4:
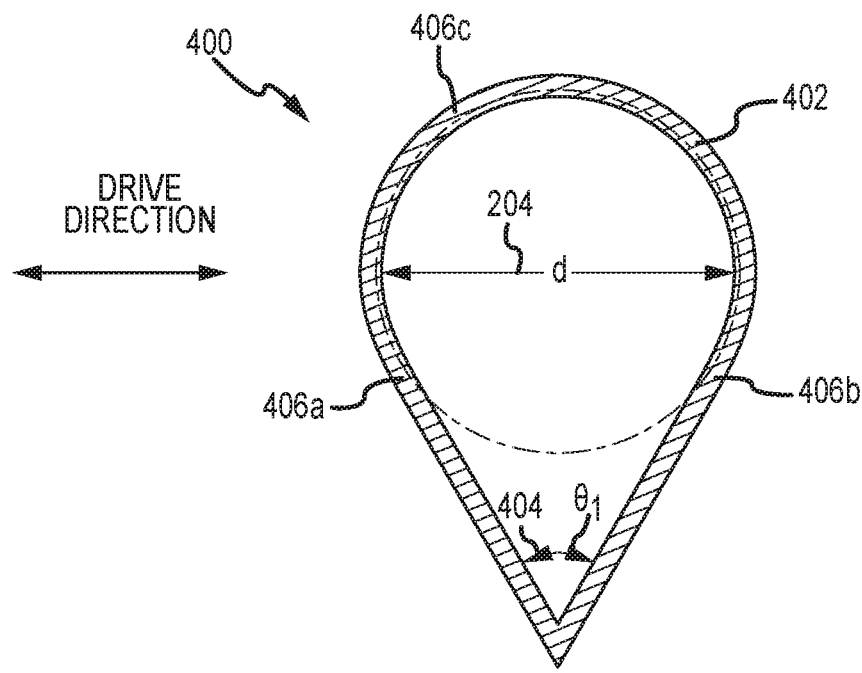
FIG. 4 depicts a cross-section of a flow tube 400, in accordance with an example.

FIG. 4 depicts a cross section of flow tube 400 in accordance with an example. Flow tube 400 includes a tube perimeter wall 402. A tube perimeter wall surrounds and contains fluid in a flow tube.

Tube perimeter wall 402 includes a first substantially planar section, a second substantially planar section, coupled to the first substantially planar section to form a first angle $\theta_1$, and a first curved section. For example, tube perimeter wall 402 includes first substantially planar section 406a, second substantially planar section 406b, and first curved section 406c. In the example, first and second substantially planar sections 406a, 406b, and first curved section 406c combine to form a teardrop cross sectional shape, with first and second substantially planar sections 406a, 406b forming a pointed section that points outward from the tube perimeter wall 402, as defined by first angle $\theta_1$ 404.

By substantially planar, first and second substantially planar sections 406a, 406b may each include a cross sectional area that is primarily contained in a rectangular area with a width that is a small proportion of the length. While FIG. 4 depicts the first and second substantially planar sections 406a and 406b as being strictly planar, this is not intended to be limiting. In examples, a substantially planar section may include a few uneven, or non-planar portions.

Tube perimeter wall 402 further includes a first curved section 406c. A curved section may take a circular, oval, elliptical, or any other kind of rounded shape. In the example of flow tube 400, first curved section 406c is primarily circular.

First and second substantially planar sections 406a and 406b are coupled together to form a first angle $\theta_1$. First angle $\theta_1$ 404 is measured from the interior of tube perimeter wall 402, as may be seen in FIG. 4.

By providing a curved section 406c, which may in examples be sized to have the same diameter d 204 as prior art flow tubes such as flow tubes 200 and 300, flow tube 400 may be retrofitted into the same vibratory meters as flow tubes 200 and 300 with minimal design changes. This is suggested by the dotted line in FIG. 4, which represents the inner diameter of flow tube 200. Because diameter d 204 does not increase over flow tubes 200 and 300, however, flow tube 400 will not increase the flow profile effects of a meter into which it is retrofitted.

Flow tube 400 features an additional pointed section defined by first and second substantially planar sections 406a and 406b, which may allow flow tube 400 to increase the cross sectional area over which fluid may flow, without a need to increase the overall size of the vibratory meter.

In examples, flow tube 400 may offer the most additional cross sectional area when first angle $\theta_1$ is smaller, because this may allow the pointed section of flow tube 400 to extend the furthest in a direction perpendicular to the diameter d 204. In examples, the first angle $\theta_1$ may be no larger than 100 degrees. In further examples, the first angle $\theta_1$ may be less than or equal to 120 degrees, however. In further examples, any angle may be possible to control the flow of fluid through flow tube 400, as will be understood by those of skill.

Figure 5:
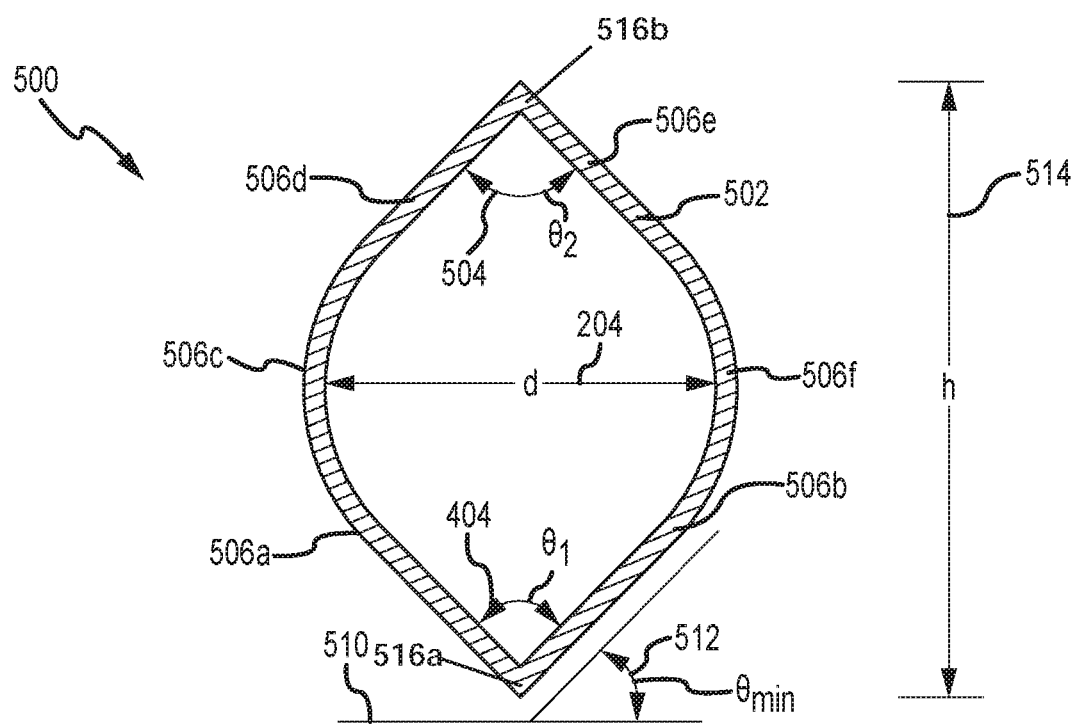
FIG. 5 depicts a cross-section of a flow tube 500, in accordance with an example.

FIG. 5 depicts a cross section of flow tube 500 in accordance with a further example. Flow tube 500 is similar to flow tube 400, except that it further includes a second curved section 506f and a third substantially planar section 506d coupled to a fourth substantially planar section 506e.

Flow tube 500 has a tube perimeter wall 502 with profile that includes two pointed sections and a rounded center. This may allow flow tube 500 to be easily retrofitted into the same vibratory meters as flow tubes 200 or 300, but with two pointed sections to further expand the cross-sectional area of the tube perimeter wall 502 and allow additional fluid flow in a vibratory meter.

The third substantially planar section 506d and the fourth substantially planar section 506e form a second angle $\theta_2$ 504. In examples, the first angle $\theta_1$ 404 may be equal to the second angle $\theta_2$. This may provide symmetry about an axis transverse to flow in flow tube 500. This may help balance the mass of the components of a vibratory meter, thereby allowing for easier retrofitting into vibratory meters with prior symmetrical circular flow tubes.

In further examples, however, first angle $\theta_1$ may not be equal to the second angle $\theta_2$.

In examples where the first angle $\theta_1$ and the second angle $\theta_2$ are the same, a first pointed section 516a to a second pointed section 516b height h 514, as depicted in FIG. 5, may be equal to:

$$h = \frac{d}{\cos\left(90 - \frac{\theta 1}{2}\right)}, \quad \text{(Equation 1)}$$

where the first pointed section 516a is formed by the first substantially planar section 506a and the second substantially planar section 506b, the second pointed section 516b is formed by the third substantially planar section 506d and the fourth substantially planar section 506e, and d is the maximum diameter of the tube perimeter wall in a plane perpendicular to the first pointed section to second pointed section height h. In examples, maximum diameter d may be an inner tube diameter, an outer tube diameter, or a center tube diameter. For example, maximum diameter d may be maximum diameter d 204, as depicted in FIG. 4 or 5.

In examples, flow tube perimeter walls 402 or 502 may be formed over a mandrel and seam welded, via an extrusion process, via a subtractive manufacturing process, for example using machining, electrical discharge machining, electrochemical machining, electron beam machining, photochemical machining, or ultrasonic machining, or via an additive manufacturing or three-dimensional (3D) printing techniques, for example using stereolithography, digital light processing, fused deposition modeling, selective laser sintering, selective laser melting, electronic beam melting, or laminated object manufacturing.

In instances where it is desirable to fabricate a flow tube via 3D printing, flow tubes 400 and 500 may offer further advantages over flow tubes 200 and 300. In some applications, it can be challenging to use 3D printing to fabricate sections of parts that are oriented within a minimum angle of parallel to the printer bed. This may be seen in FIG. 5, which depicts printer bed plane 510 and minimum print angle $\theta_{min}$ 512. If a section of a part is oriented to be below minimum print angle $\theta_{min}$ 512, additional material will need to be printed under that section as a support to fabricate the part. In some applications, minimum angle $\theta_{min}$ 512 may be 45 degrees for 3D printing applications. In further applications, however, minimum angle $\theta_{min}$ 512 may be 40 degrees, 30 degrees, 20 degrees, or even less.

Prior flow tubes 200 and 300 are circular, and include sections that are parallel to or nearly parallel to the 3D printer bed. A circular perimeter tube wall, for example, may require supports below the bottom of the flow tube perimeter wall, outside of the flow tube, and/or at the top of the flow tube perimeter wall, inside the flow tube. Support material that is printed inside the tube perimeter wall may require removal after printing, however, which can be difficult, and sometimes even impossible to do.

The pointed section of first and second substantially planar sections 406a and 406b may be printed so that it is pointing directly towards or away from printer bed 510. If minimum print angle $\theta_{min}$ 512 is 50 degrees, then a first angle $\theta_1$ that is 100 degrees or less will make it feasible to print flow tube 500 without additional support material external to flow tube 500. In the case that first and second substantially planar sections 406a and 406b may be printed so that they are pointing directly towards printer bed 510, as depicted in FIG. 5, this may prevent a need for support material external to flow tube 500. In the case that first and second substantially planar sections 406a and 406b may be printed so that they point away from printer bed 510, however (not pictured) this may prevent a need for support material internal to flow tube 500. Self-supported flow tube 500 may provide for less wasted material during manufacturing, in addition to eliminating the need for the extra step of removing the support material after printing flow tube 500.

Figure 6:
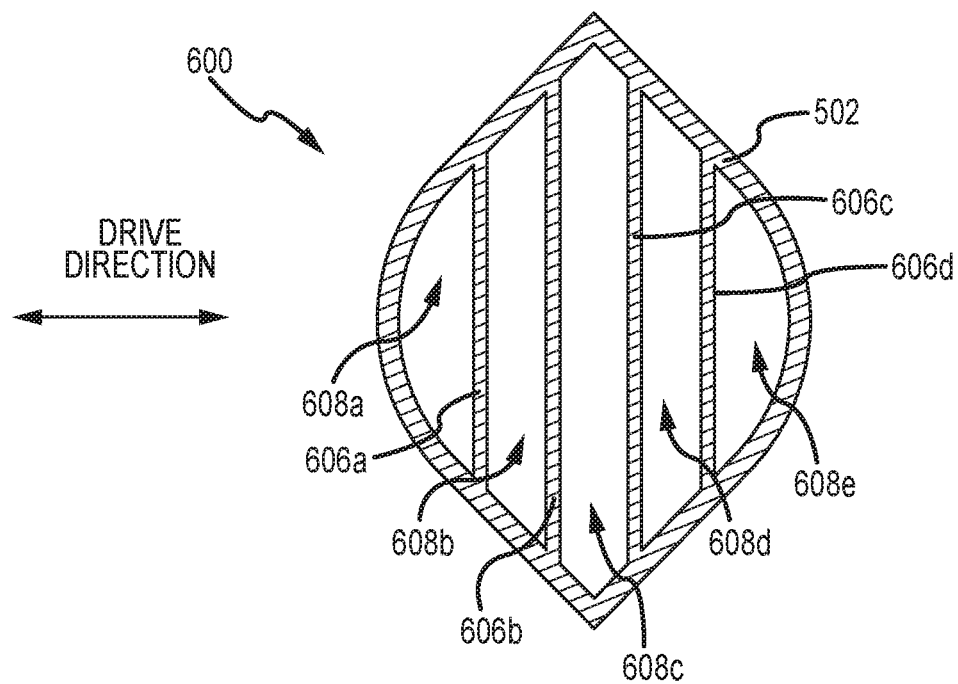
FIG. 6 depicts a cross-section of a flow tube 600, in accordance with an example.

FIG. 6 depicts a cross section of multichannel flow tube 600 in accordance with a further example. Flow tube 600 is similar to flow tube 500, except that it further includes a first channel division enclosed within and coupled to the tube perimeter wall, the first channel division and the tube perimeter wall forming a first channel and a second channel in the flow tube. Channel divisions may be coupled to a flow tube perimeter wall in one or two sections, with respect to tube perimeter wall 402 or 502, to divide a single flow tube into two or more channels. For example, channel division 606a divides flow tube 600 into channels 608a and 608b.

Channel divisions may be coupled to a flow tube perimeter wall along a longitudinal section of the flow tube. In examples, the channel divisions may be coupled to the flow tube perimeter wall along the entire longitudinal extent of the flow tube, along the vibratory section of the flow tube, along a portion of the vibratory section of the flow tube, or along any other longitudinal section of the flow tube.

In examples, the first channel division may be substantially planar. In further embodiments, however, the one or more channel divisions 606a-606d may include a curvilinear cross section, a substantially circular cross section, or any other cross section known to those of skill.

For example, flow tube 600 depicts substantially planar channel divisions 606a-606d. In the example of flow tube 600, the substantially planar channel divisions 606a-606d are perpendicular to the drive direction. In examples, however, channel divisions 606a-606d may not be oriented to be perpendicular to the drive direction. In further examples, however, the orientation of channel divisions 606a-606d may change from cross sectional area to cross sectional area of vibratory meter 10.

In examples, flow tube 600 may further comprise a second channel division enclosed within and coupled to the tube perimeter wall, the second channel division dividing the second channel and a third channel in the flow tube. For example, channel divisions 606a-606d divide flow tube 600 into channels 608a-608e. In examples, any number of channel divisions are possible, as will be understood by those of skill.

In examples, the second channel division 606b may be substantially planar, and/or substantially parallel to the first channel division 606a.

Flow tube 600 may allow for a multichannel flow tube to have a cross sectional area with expanded space for fluid flow in the additional one or more pointed regions over prior flow tubes. This may allow flow tube 600 to compensate for the cross-sectional area lost due to the thickness of the one or more channel divisions 606a-606d.

While flow tube 600 is depicted as including two pointed regions, those of skill will readily understand that one or more channel divisions may also be included with flow tube 400 to provide additional cross sectional area for a multichannel flow tube.

Figure 7:
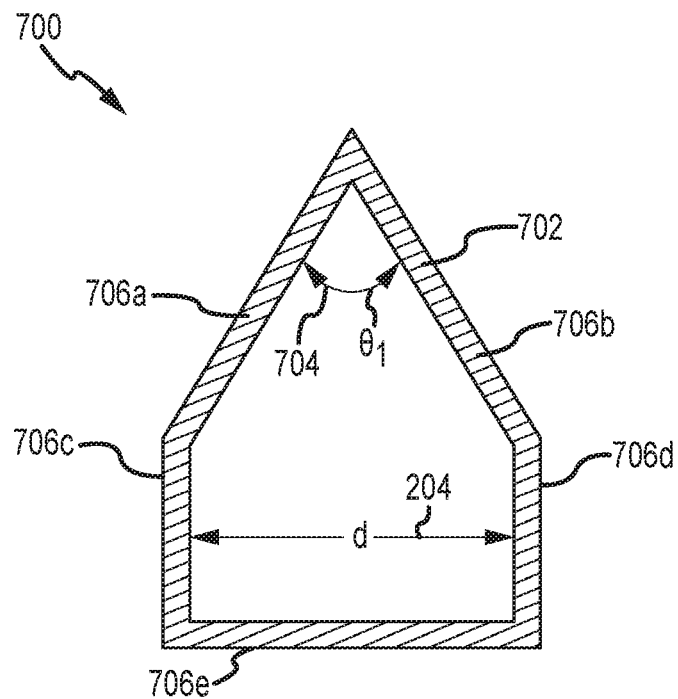
FIG. 7 depicts a cross-section of a flow tube 700, in accordance with an example.

FIG. 7 depicts a cross section of further flow tube 700 in accordance with an example. Flow tube 700 includes a tube perimeter wall with a first substantially planar section, a second substantially planar section coupled to the first substantially planar section to form a first angle $\theta_1$, a third substantially planar section, a fourth substantially planar section, and a fifth substantially planar section. For example, flow tube perimeter 702 includes first, second, third, fourth, and fifth substantially planar sections 706a, 706b, 706c, 706d, and 706e, respectively. The cross section of flow tube 700 forms a pentagonal shape, with first and second substantially planar sections 706a and 706b forming a pointed section with a first angle $\theta_1$ 704.

Flow tube 700 may provide the same advantages described with regards to flow tubes 400, 500, and 600. In particular, flow tube 700 may allow for an expanded area for fluid to flow through a flow tube, for single channel or multichannel flow tubes.

In examples, the first angle $\theta_1$ 704 may be less than or equal to 100 degrees. In further examples, the first angle $\theta_1$ 704 may be less than or equal to 120 degrees. This may maximize for additional cross sectional area in flow tube 700. In addition, the pointed section of flow tube may provide for self-supported flow tube design for 3D printing.

Figure 8:
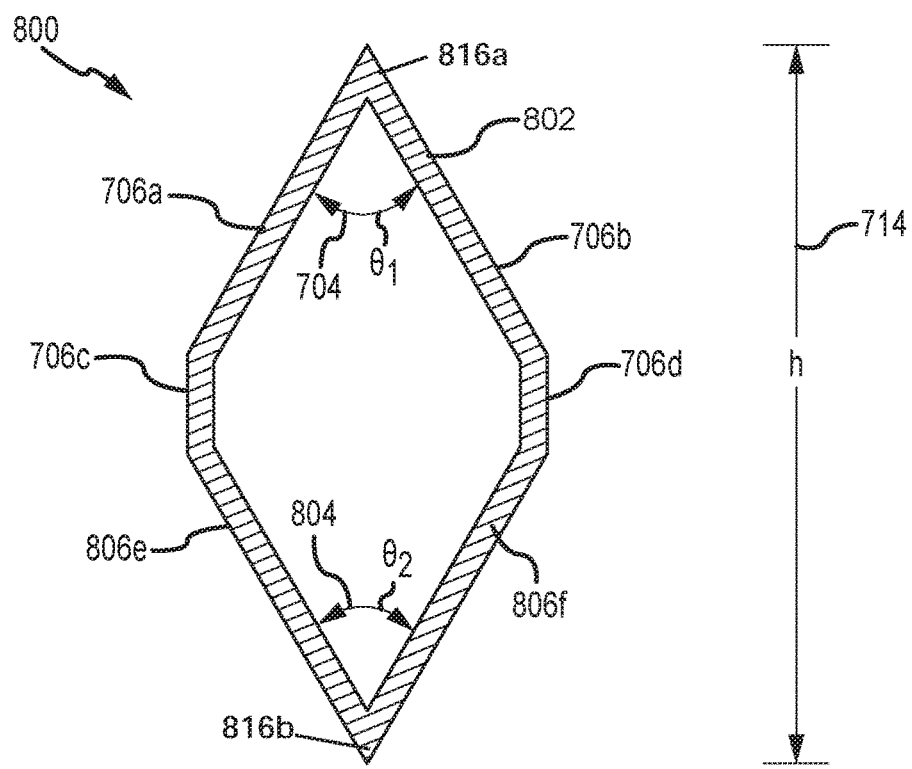
FIG. 8 depicts a cross-section of a flow tube 800, in accordance with an example.

FIG. 8 depicts a cross section of flow tube 800 in accordance with a further example. Flow tube 800 is like flow tube 700, with the additional feature that tube perimeter wall 802 includes a sixth substantially planar section. The fifth substantially planar section 806e and the sixth substantially planar section 806f form a second angle $\theta_2$ 804. Flow tube perimeter wall 802 of flow tube 800 takes the form of a hexagon, with first and second substantially planar sections 706a and 706b forming a first pointed section defined by first angle $\theta_1$ 704, and fifth substantially planar section 806e and the sixth substantially planar section 806f defined by a second angle $\theta_2$ 804.

Flow tube 800 may allow for additional cross sectional area over flow tube 700, without increasing the overall size of the vibratory meter.

In examples, the second angle $\theta_2$ 804 may be equal to the first angle $\theta_1$ 704. This may provide for a symmetrical flow tube cross section in a direction transverse to the flow direction.

In examples, a first pointed section 816a to a second pointed section 816b height $$h514 \text{ is } h = \frac{d}{\cos\left(90 - \frac{\theta 1}{2}\right)},$$

where the first pointed section 816a is formed by the first substantially planar section 706a and the second substantially planar section 706b, the second pointed section 816b is formed by the fifth substantially planar section 806e and the sixth substantially planar section 806f, and $d$ is the maximum diameter d of the tube perimeter wall perpendicular to the first pointed section to second pointed section height h, as described with regards to Equation 1 above.

Figure 9:
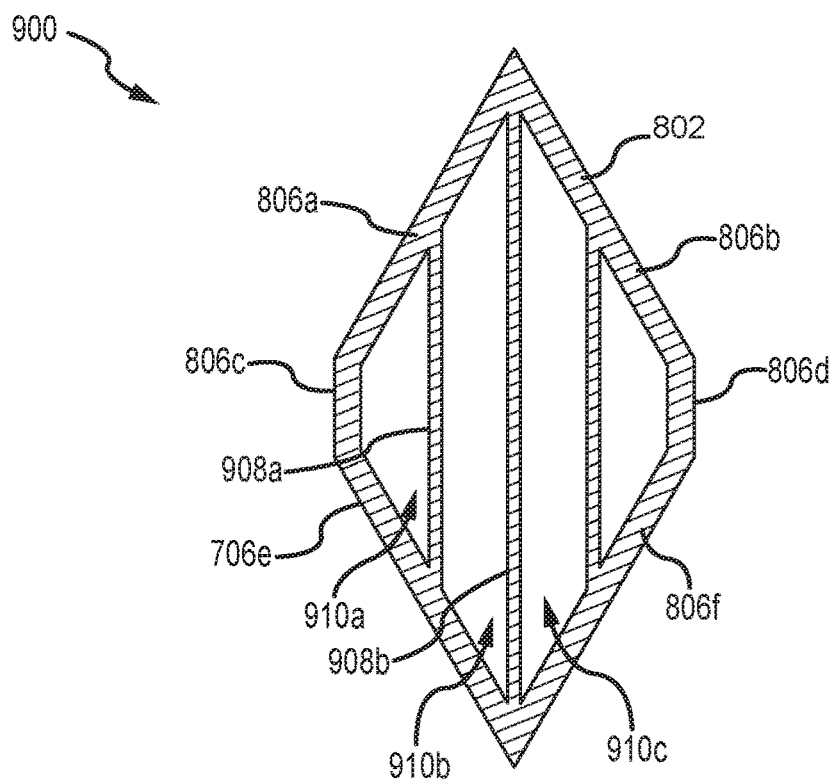
FIG. 9 depicts a cross-section of a flow tube 900, in accordance with an example.

FIG. 9 depicts a cross section of flow tube 900 in accordance with a further example. Flow tube 900 is a multichannel version of flow tube 800. Flow tube 900 includes a first channel division 908a enclosed within and coupled to the tube perimeter wall 802, the first channel division 908a and the tube perimeter wall 802 forming a first channel 910a and a second channel 910b in the flow tube.

In examples, the first channel division may be substantially planar.

In examples, a second channel division 908b may be enclosed within and coupled to the tube perimeter wall 802, the second channel division 908b dividing the second channel 910b and a third channel 910c in the flow tube.

In examples, the second channel division may be substantially planar and substantially parallel to the first channel division.

In examples, the pointed sections of flow tubes 400, 500, 600, 700, 800, and 900 defined by first and second angles $\theta_1$ and $\theta_2$, 404, 504a, 504b, 704, and 804 may be included along the entire longitudinal length of flow tubes 130, 130'. In further examples, however, first and second angles $\theta_1$ and $\theta_2$, 404, 504a, 504b, 704, and 804 may be included along only a portion of the longitudinal length of flow tubes 130, 130'. Other portions may be circular, for example, or any other cross section known to those of skill.

Figure 10:
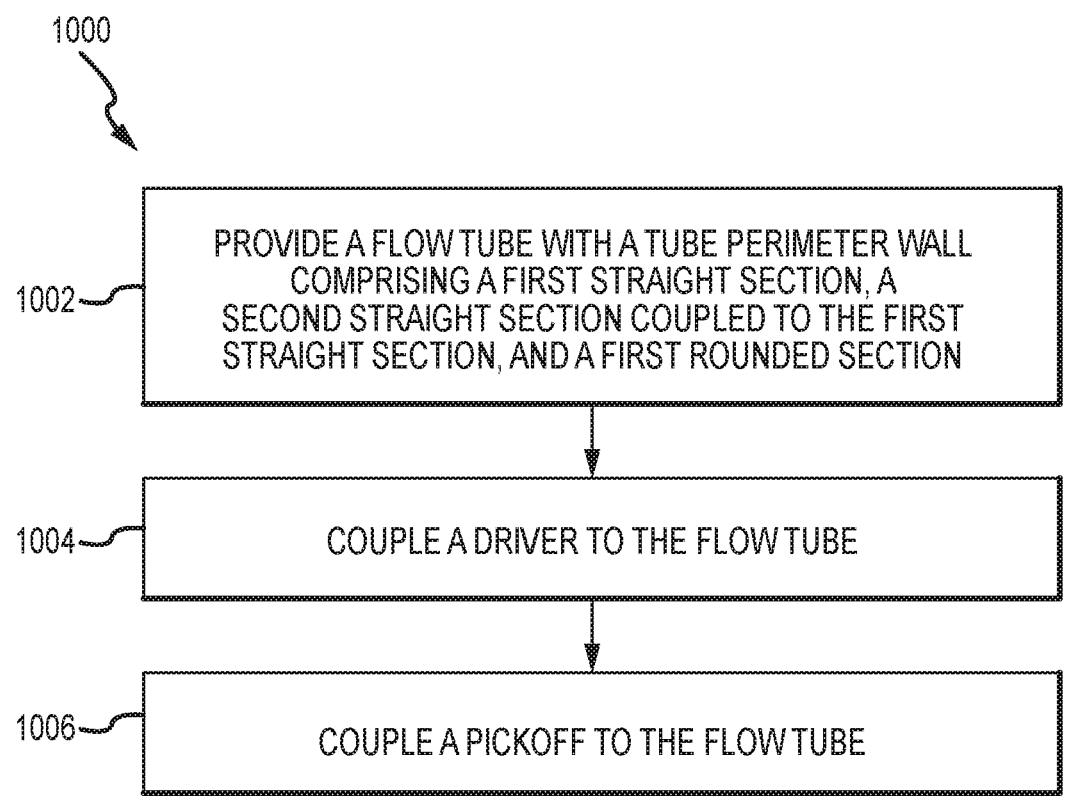
FIG. 10 depicts a method 1000, in accordance with an example.

FIG. 10 depicts a method 1000, in accordance with an example. Method 1000 begins with step 1002. In step 1002, a flow tube with a tube perimeter wall is provided. The tube perimeter wall comprises a first substantially planar section, a second substantially planar section coupled to the first substantially planar section to form a first angle $\theta_1$, and a first curved section. For example, tube perimeter wall 402, 502 includes first substantially planar section 406a, 506a and second substantially planar section 406b, 506b, which are coupled to form first angle $\theta_1$ 404, 504a, and first curved section 406c, 506c.

Method 1000 continues with step 1004. In step 1004, a driver is coupled to the flow tube. For example, driver 180 may be coupled to flow tube 130, 130', 400, 500, 600, 800, or 900. In examples, driver 180 may be coupled to the flow tube using a mounting bracket that is welded, brazed, glued, or fastened to the flow tube. In further examples, a mounting bracket, or a portion of the driver, may be integrated into the flow tube. In further examples, driver 180 may be coupled to the flow tube using any technique known to those of skill.

Method 1000 continues with step 1006. In step 1006, a pickoff is coupled to the flow tube. For example, pickoff 170l, 170r may be coupled to flow tube 130, 130', 400, 500, 600, 800, or 900. Like step 1004, pickoff 170l, 170r may be coupled to the flow tube using a mounting bracket that is welded, brazed, glued, or fastened to the flow tube. In further examples, a mounting bracket, or a portion of the pickoff 170l, 170r, may be integrated into the flow tube. In further examples, pickoff 170l, 170r may be coupled to the flow tube using any technique known to those of skill.

In examples of method 1000, the flow tube perimeter may further include a second curved section, a third substantially planar section, and a fourth substantially planar section coupled to the third substantially planar section to form a second angle $\theta_2$, wherein the tube perimeter wall further comprises the second curved section, the third curved section, and the fourth substantially planar section. For example, tube perimeter wall 502 of flow tube 500 may include second curved section 506f, and third and fourth substantially planar sections 506d, 506e, which define second angle $\theta_2$ 504b.

Figure 11:
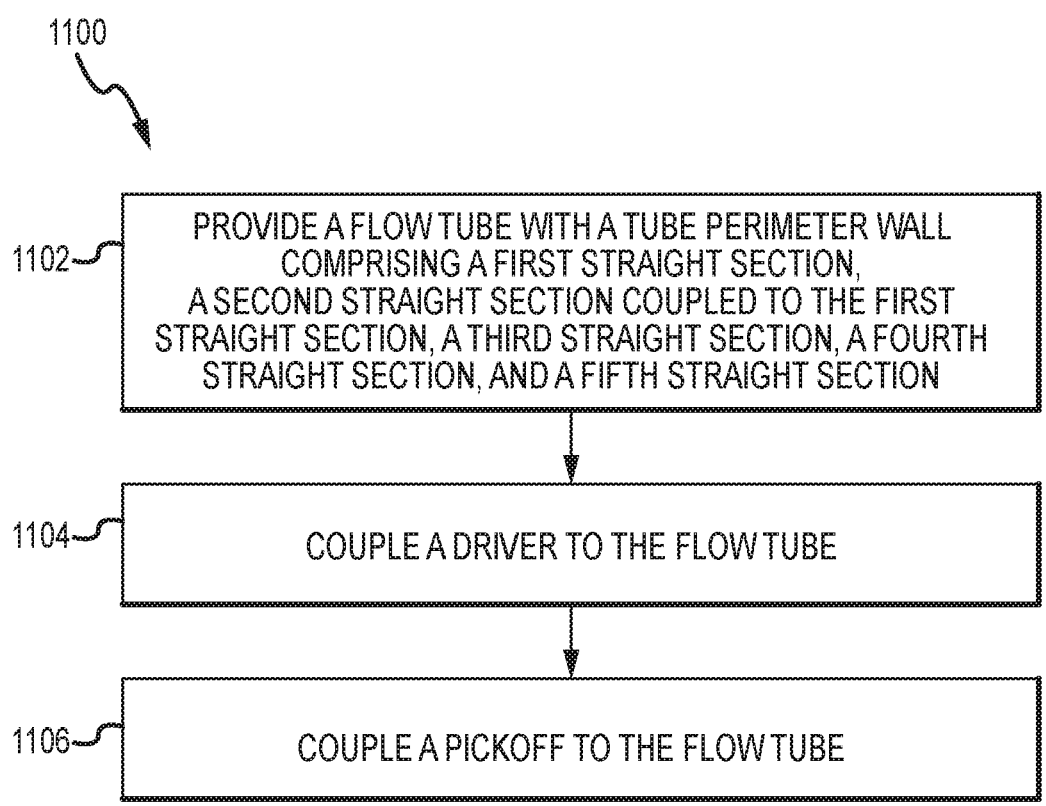
FIG. 11 depicts a method 1100, in accordance with an example.

FIG. 11 depicts a method 1100, in accordance with an example. Method 1100 begins with step 1102. In step 1102, a flow tube with a tube perimeter wall is provided comprising a first substantially planar section, a second substantially planar section coupled to the first substantially planar section to form a first angle $\theta_1$, a third substantially planar section, a fourth substantially planar section, and a fifth substantially planar section. For example, flow tube 700 may comprise tube perimeter wall 702, including first and second substantially planar sections 706a, 706b, which form a first angle $\theta_1$ 704, and third, fourth, and fifth substantially planar sections 706c, 706d, and 706e.

Method 1100 continues with steps 1104 and 1106. Steps 1104 and 1106 are similar to steps 1004 and 1006. In step 1104, a driver is coupled to the flow tube. In step 1106, a pickoff is coupled to the flow tube.

In examples of method 1100, the tube perimeter wall may further comprise a sixth substantially planar section, wherein the fifth substantially planar section and the sixth substantially planar section form a second angle $\theta_2$. For example, flow tubes 800 and 900 may include sixth substantially planar section 806f to form second angle $\theta_2$ 804.

Methods 1000 and 1100 may allow for the manufacturing of a flow tube that provides an expanded cross sectional area under one or more pointed sections defined by first angle $\theta_1$ or second angle $\theta_2$. This may provide for the manufacturing of a flow tube with additional flow.

In examples of methods 1000 or 1100, the first angle $\theta_1$ may be less than or equal to 100 degrees. In further examples of methods 1000 or 1100, the first angle $\theta_1$ may be less than or equal to 120 degrees. This may allow for the manufacturing of a flow tube that can be 3D printed without additional material supports.

In examples of methods 1000 or 1100, the first angle $\theta_1$ may be equal to the second angle $\theta_2$. This may allow for the manufacturing of a flow tube with symmetry in the direction transverse to the fluid flow.

In examples of methods 1000 or 1100, a first pointed section 816a to second pointed section 816b height h may be $$h = \frac{d}{\cos\left(90 - \frac{\theta 1}{2}\right)},$$

where the first pointed section 816a is formed by the first substantially planar section 706a and the second substantially planar section 706b, the second pointed section 816b is formed by the fifth substantially planar section 806e and the sixth substantially planar section 806f, and d is the maximum diameter d (204) of the tube perimeter wall perpendicular to the first pointed section to second pointed section height h, as described with regards to Equation 1 above.

In examples of methods 1000 or 1100, a first channel division may be enclosed within and coupled to the tube perimeter wall, the first channel division and the tube perimeter wall forming a first channel and a second channel in the flow tube.

In examples of methods 1000 or 1100, the first channel division may be substantially planar.

In examples of methods 1000 or 1100, a second channel division may be enclosed within and coupled to the tube perimeter wall, the second channel division dividing the second channel and a third channel in the flow tube.

Providing for the manufacture of a multichannel flow tube with additional cross sectional area may allow for the accommodation of the cross sectional area lost from the channel division wall width.

The devices and methods disclosed herein may help preserve meter accuracy while increasing the cross-sectional area of a flow tube. Accordingly, flow tubes 300, 400, 500, 600, 700, 800, and 900 may be retrofitted into existing vibratory meter designs, to realize the benefits associated with the larger cross sectional area diameter. In addition, flow tubes 300, 400, 500, 600, 700, 800, and 900 may be more easily fabricated via additive manufacturing without a need to provide additional support material.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

What is claimed is:

1. A vibratory meter (5) comprising:
    a pickoff (170l, 170r) attached to a flow tube (400, 500, 600, 700, 800, 900);
    a driver (180) coupled to the flow tube, the driver being configured to vibrate the flow tube; and
    the flow tube comprising a tube perimeter wall (402, 502, 702, 802) comprising:
        a first substantially planar section (406a, 506a),
        a second substantially planar section (406b, 506b), coupled to the first substantially planar section to form a first angle $\theta_1$ (404), and
        a first curved section (406c, 506c).

2. A vibratory meter as claimed in claim 1, wherein the first angle $\theta_1$ is less than or equal to 100 degrees.

3. A vibratory meter as claimed in claim 1, wherein the first angle $\theta_1$ is less than or equal to 120 degrees.

4. A vibratory meter as claimed in claim 1, wherein the tube perimeter wall further comprises a second curved section (506f) and a third substantially planar section (506d) coupled to a fourth substantially planar section (506e), wherein the fifth substantially planar section and the sixth substantially planar section form a second angle $\theta_2$ (504).

5. A vibratory meter as claimed in claim 1, wherein the second angle $\theta_2$ is equal to the first angle $\theta_1$.

6. A vibratory meter as claimed in claim 5, wherein a first pointed section (516a) to a second pointed section (516b) height h (514) is $$h = \frac{d}{\cos\left(90 - \frac{\theta 1}{2}\right)},$$

wherein the first pointed section is formed by the first substantially planar section and the second substantially planar section, the second pointed section is formed by the third substantially planar section and the fourth substantially planar section, and d is the maximum diameter d (204) of the tube perimeter wall perpendicular to the first pointed section to second pointed section height h.

7. A vibratory meter as claimed in claim 1, further comprising:
    a first channel division (606a) enclosed within and coupled to the tube perimeter wall, the first channel division and the tube perimeter wall forming a first channel (608a) and a second channel (608b) in the flow tube.

8. A vibratory meter as claimed in claim 7, wherein the first channel division is substantially planar.

9. A vibratory meter as claimed in claim 7, further comprising:
    a second channel division (606b) enclosed within and coupled to the tube perimeter wall, the second channel division dividing the second channel and a third channel (608c) in the flow tube.

10. A vibratory meter as claimed in claim 9, wherein the second channel division is substantially planar and substantially parallel to the first channel division.

11. A method of forming a vibratory meter, the method comprising:
    providing a flow tube with a tube perimeter wall comprising:
        a first substantially planar section,
        a second substantially planar section coupled to the first substantially planar section to form a first angle $\theta_1$, and
        a first curved section;
    coupling a driver to the flow tube; and
    coupling a pickoff to the flow tube.

12. A method of forming a vibratory meter as claimed in claim 11, wherein the tube perimeter wall further comprises:
    a second curved section;
    a third substantially planar section; and
    a fourth substantially planar section coupled to the third substantially planar section to form a second angle $\theta_2$, wherein the tube perimeter wall further comprises the second curved section, the third curved section, and the fourth substantially planar section.

13. A method of forming a vibratory meter as claimed in claim 12, wherein a first pointed section (516a) to a second pointed section (516b) height h (514) is $$h = \frac{d}{\cos\left(90 - \frac{\theta 1}{2}\right)},$$

wherein the first pointed section is formed by the first substantially planar section and the second substantially planar section, the second pointed section is formed by the third substantially planar section and the fourth substantially planar section, and d is the maximum diameter d (204) of the tube perimeter wall perpendicular to the first pointed section to second pointed section height h.

14. A method as claimed in claim 11, wherein the first angle $\theta_1$ is less than or equal to 100 degrees.

15. A method as claimed in claim 11, wherein the first angle $\theta_1$ is less than or equal to 120 degrees.

16. A method as claimed in claim 12, wherein the first angle $\theta_1$ is equal to the second angle $\theta_2$.

17. A method as claimed in claim 11, wherein the flow tube further comprises a first channel division enclosed within and coupled to the tube perimeter wall, the first channel division and the tube perimeter wall forming a first channel and a second channel in the flow tube.

18. A method as claimed in claim 11, wherein the first channel division is substantially planar.

19. A vibratory meter as claimed in claim 11, wherein the flow tube further comprises a second channel division enclosed within and coupled to the tube perimeter wall, the second channel division dividing the second channel and a third channel in the flow tube.

* * * * *